Figure 1:
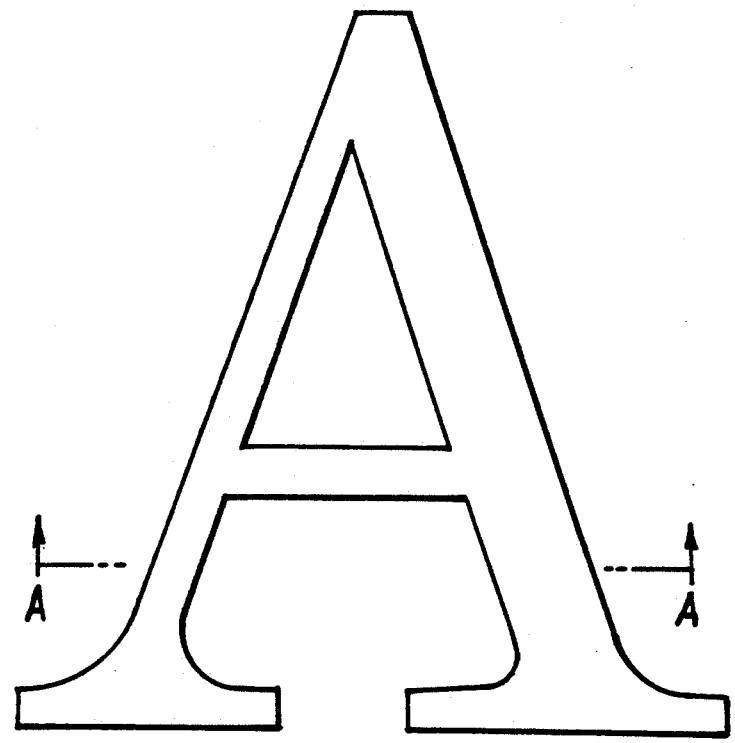

United States Patent [19]
Keith

[11] Patent Number: 5,275,675
[45] Date of Patent: Jan. 4, 1994

[54] PRODUCTION OF INTAGLIO DESIGNS IN CAST ACRYLIC

[76] Inventor: Donald G. Keith, 130 Bayview Garden Village, Cabbage Tree Road, Bayview, New South Wales 2104, Australia

[21] Appl. No.: 911,494

[22] Filed: Jul. 10, 1992

[30] Foreign Application Priority Data

Jul. 23, 1991 [AU] Australia .................... PK7366

[51] Int. Cl.$^5$ .................. B29C 59/02; B32B 7/12; B32B 27/30
[52] U.S. Cl. .................. 156/155; 156/292; 156/330.9; 264/79; 264/80; 264/134; 264/162; 264/233; 264/293
[58] Field of Search .................. 264/79, 80, 134, 162, 264/233, 293; 156/327, 330.9, 155, 292

[56] References Cited

U.S. PATENT DOCUMENTS

| | | | |
|---|---|---|---|
| 2,463,370 | 3/1949 | Flaster | 264/293 |
| 2,682,687 | 7/1954 | Franz | 264/80 |
| 2,914,109 | 11/1959 | Hsu et al. | 264/134 |
| 3,549,733 | 12/1970 | Caddell | 264/80 |
| 4,076,772 | 2/1978 | Murbach et al. | 264/134 |
| 4,079,112 | 3/1978 | Stransky et al. | 264/162 |
| 4,105,715 | 8/1978 | Gleave | 156/330.9 |
| 4,141,944 | 2/1979 | Anstadt et al. | 264/162 |
| 4,664,860 | 5/1987 | Wagner | 264/134 |
| 4,737,329 | 4/1988 | Rakoczy | 264/134 |
| 4,795,600 | 1/1989 | Kromrey | 264/134 |
| 4,954,192 | 9/1990 | Dziekan | 264/233 |
| 5,041,181 | 8/1991 | Brackett et al. | 156/153 |

Primary Examiner—Jan H. Silbaugh
Assistant Examiner—Brian J. Eastley
Attorney, Agent, or Firm—Oliff & Berridge

[57] ABSTRACT

A method for producing intaglio designs in cast acrylic material, wherein a moulding tool hotter than 600° C. is applied to a surface contact area of an acrylic surface in which the intaglio copy of the moulding tool is to be formed, and the moulding tool is withdrawn from the surface contact area before the temperature of the tool or the acrylic material of said area falls below that at which methyl methacrylate vapor ceases to be produced by the depolymerization of the acrylic material. The preferred withdrawal temperature is above 250° C.

10 Claims, 1 Drawing Sheet

PRODUCTION OF INTAGLIO DESIGNS IN CAST ACRYLIC

This invention relates to a method and apparatus for producing intaglio or incised designs in cast acrylic polymer material and in articles fabricated from such material.

The term "acrylic polymer" or simply "acrylic" is used in this specification to refer to high molecular weight polymethyl methacrylate. Plasticised lower molecular weight methyl methacrylate moulding powders, which melt when heated forming sticky pastes, are also available but are not included in the "acrylic" materials to which this specification refers and to which this invention applies.

Acrylic polymer as cast has a very high molecular weight and may be cast as sheets or other forms of great clarity. Cast acrylic polymer is available in sheet form under the trade marks PERSPEX and PLEXIGLAS. As acrylic polymer is normally cast in sheet form, the invention will be described primarily in relation to the use of material in sheet form. It will be appreciated however, that the sheets may be relatively thick (1 cm or more). It will also be understood that the invention may be applied to other forms in which acrylic polymer may be cast, such as rod or tube.

Incised designs may be formed by injection moulding of acrylic powders. However, the outlay in time and cost for this procedure is so high that large quantity productions runs are needed for economic unit cost. Further, moulding cannot be used to decorate items of existing sheet or articles fabricated from sheet.

Incised work may alternatively be made by drilling, milling or routing. Such operations may optionally be cam-controlled or numerically controlled. For example, pantograph engraving is widely used for incising text, as in nameplates. Excavation by machine tends to produce uniform depth, constant profile cuts: for example, engraved signs are almost always in sans serif font. The in-situ production of fully sculptural intaglio forms of changing complex curvature is, by any known means, impossible or of prohibitive difficulty for commercial reproduction.

One means of producing incised design in various materials is by surface decomposition, such as carbonisation by a red hot metal tool. Such work may be known as branding, where the decomposition occurs simultaneously over the whole design surface, or pokerwork where it is sequential. Branding in the general sense aims usually at rapid indelible marking and the profile of material removal is not of major concern.

We have observed that a red hot metal object applied to acrylic sheet causes local decomposition with copious effusion of vapour, which may optionally be allowed to ignite. The chemical work of decomposing the polymer rapidly quenches the hot metal and the vapour carries heat away. By this process an intaglio copy of a convex tool may be produced with some areas of great fidelity but unacceptable side effects occur.

First, and most serious, as the material at the nascent cavity surface conducts heat inward, bubbling and blistering commence and the cavity surface is marred.

Second, the abundant vapour tends to act as a solvent and crazing agent on the adjacent sheet surface. These occurrences mar the flat and lucid surface for which acrylic sheet is valued.

Third, even where the pressure of hot tool on sheet is minimised, a ridge of ejected hot polymer tends to form around the cavity.

The underlying cause of these problems lies in the nature of the acrylic sheet itself. Cast acrylic sheet is a high polymer of methyl methacrylate monomer and has an unusual response to temperature change. The pure monomer boils at 101° C. at normal temperature and pressure. However, in high molecular weight cast sheet, the polymer is chemically stable up to above 150° C., although above 130° C. the sheet softens to a rubbery form. If sheet is heated superficially, or throughout, to temperatures above 160° C., depolymerisation begins and the material begins to blister. At 180° C. the material blisters, boils and degrades slowly. At higher temperatures, namely above 250° C., the entire polymer mass reverts to its monomer as vapour. As a result it is possible to practice destructive distillation of scrap acrylic polymer to recover monomer in high yield.

In accordance with the present invention we have found that the first problem referred to above can be avoided, and desirably clear and sharp moulded cavities formed. Thus, if a moulding tool hotter than 600° C., preferably at about 750° C., is applied to the acrylic surface in which the intaglio copy is to be formed, but withdrawn from the surface before the temperature of the tool or the acrylic material anywhere in the surface contact area falls below that at which methyl methacrylate vapour ceases to be produced by the depolymerisation of the acrylic material, a precise negative facsimile of the applied tool surface will be obtained in the acrylic surface. Preferably, the tool is withdrawn before the temperature of the tool or of the surface contact area falls below 250° C. The temperature at which the moulding tool is applied to the acrylic surface should be greater than 600° C. to enable an impression of sufficient depth to be formed before the tool cools and must be removed. Tool temperatures may be as high as 1400° C. but 1000° C. is a practical limit in terms of energy cost.

The moulding tool should be removed at a temperature as high as practicable, consistent with adequate forming. In any event, removal at temperatures of 250° C. to 300° C. while gas is still vigorously forming will prevent degradation of the surface cavity. The moulding tool should be removed quickly when gas evolution ceases as this indicates that the tool temperature has fallen below that necessary to maintain the benefit of the present invention. If necessary for a deeper impression, the acrylic material may be cooled and the tool reheated for one or more successive applications.

The moulding tool is preferably applied to the acrylic surface with minimal pressure. Thus, the pressure does not need to be greater than that required to produce immediate depolymerisation of the acrylic material at the surface contact area. As the work on the acrylic surface depends on conversion of the acrylic to gas and not on its solid material displacement, application pressure need only be light, for example about 100 grams force per square centimeter is satisfactory. Minimal tool pressure against the acrylic surface will minimise the heat transfer from the tool to the acrylic material, thus maximising the time period for which the tool will remain above its lower useful temperature limit. The copious flow of monomer vapour acts both in the manner of an air bearing and as a thermal insulation layer which further prevents overheating of the cavity.

The form of the moulding tool will depend both on the design to be reproduced and on the form of the acrylic material in which the inverse reproduction is to be made. Reproduction is highly accurate so that unpolished tools leave lustrous cavities. Non-planar substrate acrylic forms can be engraved. Where the tool surface has a concave region, at least one fine gas-escape hole or other passageway through the tool body may be provided. The attack of the tool on the acrylic surface may be perpendicular or skewed. Skewed or oblique attack of the tool on the surface allows the production of undercut forms. The forming process may be mechanised; for example a rotary series of hot tools may be applied to a laterally moving sheet.

The tool may be formed of any suitable heat conducting material. Preferably the tool material is a refractory metal such as chrome cobalt.

Where the design being moulded requires a tool having parts which are separate from, which project from, or which otherwise have a smaller contact surface area than, the main body of tool, such parts are likely to cool more rapidly than the main body. As this is undesirable, the invention includes the preferred addition of an additional mass of heat conducting tool material as necessary to supplement any parts of the tool having a smaller surface area which will contact the acrylic material, so that all parts of the tool have roughly the same heat retention capacity.

This preferred feature of the invention is illustrated in the accompanying drawing.

Figure 2:
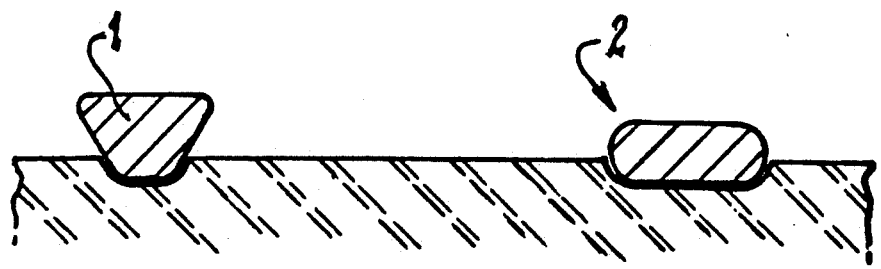

FIG. 1 of the drawing shows the design as applied to the acrylic surface;

FIG. 2 is a sectional drawing showing that part of the tool forming the design at line A—A in FIG. 1.

In the drawing, the design to be moulded is a letter A in which the type style has one side of the letter considerably wider than the other side and the cross bar.

If the tool to form this design is made with a substantially uniform depth of heat conducting material for each part of the design, the narrower leg, the cross bar and the serifs will lose heat more rapidly than the wider leg. In accordance with the preferred form of the invention, we therefore provide an additional mass of tool material behind the cavity-forming surface area of the narrower parts of the tool. This additional material marked as 1 in FIG. 2 provides a heat sink roughly equivalent to that provided by the substantially uniform depth of the tool at section 2.

The tool may be heated in any suitable manner. Flame heating or electric induction heating are two possible methods of heating which may be used. By flame heating, slender parts of the tool heat first, by induction heating such parts are not adequately heated unless additional backing mass is added. Flame heating is particularly suitable where the tool must be withdrawn from the cavity forming process to be reheated. Induction heating or electrical resistance heating may be used to prevent or slow down quenching of the tool by the depolymerisation of the acrylic polymer.

Where all or part of the design is to be moulded into the acrylic material to a depth which would require several successive applications of the heated tool, the acrylic material may be subjected to preliminary machining to assist the moulding operation by reducing the amount of acrylic material which must be depolymerised to form the desired intaglio copy. Thus, a router or similar tool can be used to form a cavity of the desired general form before a complementary moulding tool is applied within the cavity to form the fine detail of the intended design. This procedure reduces the amount of vapour formed, as well as the time and heating costs for the moulding operation.

The possible problems caused by vapour emission and pyrolysis, and by any molten polymer formation, can be controlled in accordance with a further preferred embodiment of the invention. Thus, we prefer to apply to the acrylic surface a preliminary coating of a material benign to the acrylic yet resistant to its vaporous and liquid pyrolysis products. The pyrolysis products and any emitted materials will be deposited on this coating and thus be invisible from the other side of the acrylic article. As this is the side from which the article is normally viewed, its appearance, for practical purposes, is unspoiled by the emitted by-products.

The coating material is preferably a chemically cross-linked lacquer. If intended to be left on, the coating may be an opaque water based paint. In printed coatings, vacancies may be left corresponding to intaglio outlines. If the coating is to be removed, a formulation which will assist its removal is preferred. For example, a coating of cross-linked gelatine may be used which subsequently may be removed by an enzyme wash. A gel with appreciable water content is excellent because the acrylate monomer is highly insoluble in water.

Cast acrylic materials are superior to other synthetics in permanence of water-white clarity. For this reason, cast acrylics would be useful to embed complex solids for display and preservation. However, cast acrylic materials shrink about 16% by volume during polymerisation and for this reason do not lend themselves for use in embedment without severe problems of waste and distortion. However, the process of the present invention may be used to produce an item in which a complex solid appears to be completely embedded in a sheet or block of crystal clear material.

Such an item may be produced by a method in which at least two moulding tools are prepared each enabling the formation of an intaglio design constituting part of a three-dimensional object, separate and complementary intaglio designs are prepared from each moulding tool using the method of the present invention with separate pieces of acrylic material containing the respective designs bordered by surfaces adapted to mate with complementary surfaces of one or more other such pieces, and the separate pieces are joined with their complementary designs in registry by polymerising methyl methacrylate catalysed syrup applied to the mating surfaces of adjacent pieces, to form a composite product in which a replica of the three-dimensional object appears to be embedded within a block of acrylic material.

To perform this method, a model of the complex solid may be cleaved through at least one appropriate plane and separate casts in refractory metal prepared to form the moulding tools for each part of the solid so obtained. These moulding tools are then used as described above to make intaglio cavities in separate cast acrylic sheets. Care must be taken to maintain careful alignment so that the separate sheets can be fitted together as described below.

The cavities in the separate sheets may, if desired, be made slightly deeper than the part models. The cavities may then optionally be coloured and/or filled up with translucent or opaque fillers which are impermeable to methyl methacrylate monomer. Optionally, the sheets with filled cavities may be surface treated, as by grinding, sanding or milling, to ensure flatness and remove surface deposits of filler or pigment.

It is already known that acrylic sheets can be invisibly laminated by the use of a thin layer of methyl methacrylate catalysed syrup which can be polymerised by photo curing, room temperature polymerisation or oven curing. The application of a layer of such methyl methacrylate catalysed syrup to the surfaces of the sheets containing the separate cavities, followed by joining the separate sheets in precise registry of the complimentary cavities and polymerising the syrup, will provide the desired appearance of embedment of the original complex solid within the combined sheets.

The ability of the present invention to replicate extremely fine details, such as the facets of an insect eye or the ridges and valleys of a fingerprint, makes it very valuable. Cavities containing such fine structures are not machineable. In this respect, the present invention may be seen as a major extension of lost wax metal casting technology. That technology permits a wax model, however fine-structured, to be replicated with precision in metal. A metal tool formed by lost wax casting may be used in the present invention to produce a negative replica of the tool.

The precision of the technique provided by the present invention enables its use in the replication of optical surfaces, such as micro lenses, fresnel lenses and cube corner arrays. Recesses for microcircuitry may also be formed using the precision which the present invention makes available.

As indicated above, the technique of the present invention is applicable to the mechanised production of articles which, if even capable of production previously, required painstaking hand-guided operations throughout their production. Even if the technique of the present invention is not itself completely or largely mechanised, it may be used to form intermediate products, or final products, in a procedure which is otherwise mechanised for ease and rapidity of production.

For example, the technique of the present invention can be applied on an individual or repeat basis to form a cast acrylic intermediate for subsequent hot shaping and fabrication. The intermediate may be hot shaped when softened throughout to its rubbery form, without distorting the applied intaglio design any more than if the intermediate was made of rubber itself.

As a further example, it should be appreciated that the tools required to produce intaglio designs in accordance with the invention can be fabricated so as to reproduce a required design over a substantial area. Accordingly, products such as decorative panels for architectural use can be produced with identical panels being formed in rapid succession.

The claims defining the invention are as follows:

1. A method for producing intaglio designs in cast acrylic material, comprising the steps of:
    heating a moulding tool to a temperature of at least 600° C.;
    applying said heated moulding tool to a surface contact area of an acrylic surface in which an intaglio copy of the moulding tool is to be formed, thereby producing methyl methacrylate vapour by depolymerisation of the acrylic material in the surface contact area;
    forming the intaglio copy of the moulding tool in the surface contact area of the acrylic surface with the methyl methacrylate vapour acting as a thermal insulation layer between the moulding tool and the surface contact area; and
    withdrawing the moulding tool from the surface contact area before the temperature of the tool or the acrylic material of the surface contact area falls below that at which the methyl methacrylate vapour ceases to be produced.

2. A method as claimed in claim 1, wherein the tool is withdrawn before the temperature of the tool or the acrylic material falls below 250° C.

3. A method as claimed in claim 1, wherein the tool is applied to the surface contact area with a pressure just sufficient to produce immediate depolymerisation of the acrylic material at the surface contact area.

4. A method as claimed in claim 1, wherein the moulding tool is formed from a refractory metal.

5. A method as claimed in claim 1, wherein the moulding tool is formed with each part of the tool having roughly the same heat retention capacity by adding tool material as necessary to supplement any parts of the tool having a smaller surface area which will contact the acrylic material.

6. A method as claimed in claim 1, wherein the acrylic surface in which the intaglio copy of the moulding tool is to be formed is coated prior to application of the moulding tool with a material benign to the acrylic material yet resistant to its vaporous and liquid pyrolysis products.

7. A method as claimed in claim 6, wherein the acrylic surface is coated with a chemically cross-linked lacquer.

8. A method as claimed in claim 7, wherein the acrylic surface is coated with a cross-linked gelatine and the coating which remains after the application of the moulding tool is removed by an enzyme wash.

9. A method as claimed in claim 1, wherein the acrylic material is machined prior to application of the moulding tool so as to reduce the amount of acrylic material which must be depolymerised to form the desired intaglio copy.

10. A method as claimed in claim 1, wherein at least two moulding tools are prepared each enabling the formation of an intaglio design constituting part of a three-dimensional object, separate and complementary intaglio designs are prepared from each moulding tool using the method of claim 1 with separate pieces of acrylic material containing the respective designs bordered by surfaces adapted to mate with complementary surfaces of one or more other such pieces, and the separate pieces are joined with their complementary designs in registry by polymerising methyl methacrylate catalysed syrup applied to the mating surfaces of adjacent pieces, to form a composite product in which a replica of the three-dimensional object appears to be embedded within a block of acrylic material.

* * * * *